United States Patent
Lee et al.

(10) Patent No.: US 8,687,738 B1
(45) Date of Patent: Apr. 1, 2014

(54) CIRCUITS AND METHODS USING A MAJORITY VOTE

(75) Inventors: Swee Wah Lee, Bedong (MY); Teng Chow Ooi, Bayan Lepas (MY); Chuan Khye Chai, Bayan Baru (MY)

(73) Assignee: Altera Corporation, San Jose, CA (US)

( * ) Notice: Subject to any disclaimer, the term of this patent is extended or adjusted under 35 U.S.C. 154(b) by 245 days.

(21) Appl. No.: 13/078,421

(22) Filed: Apr. 1, 2011

(51) Int. Cl.
*H04L 27/00* (2006.01)

(52) U.S. Cl.
USPC .......... 375/326; 375/224; 375/226; 375/340; 375/344; 375/354; 375/371; 375/373; 375/374; 375/375; 375/376; 455/260; 455/502; 455/516; 370/503; 370/508; 370/516; 327/141; 327/147; 327/156; 327/163

(58) Field of Classification Search
USPC ......... 375/224, 226, 326, 340, 344, 354, 371, 375/373, 374, 375, 376; 455/260, 502, 516; 370/503, 508, 516; 327/141, 147, 156, 327/163
See application file for complete search history.

(56) References Cited

U.S. PATENT DOCUMENTS

| | | | |
|---|---|---|---|
| 5,463,351 A * | 10/1995 | Marko et al. ................... | 331/1 A |
| 7,092,472 B2 | 8/2006 | Stojanovic | |
| 7,295,644 B1 | 11/2007 | Wu et al. | |
| 7,315,596 B2 | 1/2008 | Payne et al. | |
| 7,474,720 B2 * | 1/2009 | Yuuki et al. ................... | 375/354 |
| 7,720,160 B1 | 5/2010 | Gorecki et al. | |
| 2007/0217559 A1* | 9/2007 | Stott et al. .................... | 375/355 |
| 2010/0098203 A1* | 4/2010 | Chien .......................... | 375/371 |

OTHER PUBLICATIONS

Ming-ta Hsieh, et al., "Clock and Data Recovery with Adaptive Loop Gain for Spread Spectrum SerDes Applications," IEEE International Symposium on Circuits and Systems 2005, pp. 4883-4886.

\* cited by examiner

*Primary Examiner* — Leon Flores
(74) *Attorney, Agent, or Firm* — Steven J. Cahill

(57) ABSTRACT

A clock data recovery circuit includes a phase detector circuit, a majority voter circuit, and a phase shift circuit. The phase detector circuit is operable to compare a phase of a periodic signal to a phase of a data signal to generate a phase error signal. The majority voter circuit includes a shift register circuit. The shift register circuit is operable to generate an output signal based on the phase error signal. The majority voter circuit is operable to generate a majority vote of the phase error signal based on the output signal of the shift register circuit. The phase shift circuit is operable to set the phase of the periodic signal based on the majority vote generated by the majority voter circuit.

20 Claims, 7 Drawing Sheets

CIRCUITS AND METHODS USING A MAJORITY VOTE

FIELD OF THE INVENTION

The present invention relates to electronic circuits, and more particularly, to circuits and methods using a majority vote.

BACKGROUND

A high-speed serial data signal can be transmitted through transmission lines from a transmitter to a receiver without an accompanying clock signal. A clock data recovery (CDR) circuit in the receiver generates clock signals from an approximate frequency reference signal, and then phase-aligns the clock signals with respect to the data signal. The receiver uses the clock signals to sample data bits in the data signal.

A conventional CDR circuit has a phase detector circuit and a filter circuit. The phase detector compares the phase of a data signal to the phases of reference clock signals to generate a phase error signal. The filter circuit filters the phase error signal. The filter circuit in some conventional CDR circuits is implemented as a binary counter circuit. The maximum frequency of the binary counter circuit is limited by the number of unique count values generated by the binary counter circuit. In order to increase the latency of the feedback loop in the CDR circuit, for example to 120 unit intervals of the data signal, the binary counter circuit would have to generate 120 unique values in its count signals. However, a CDR circuit with a binary counter circuit large enough to generate 120 unique values in its count signals may not be able to operate at a high frequency (e.g., 3.125 gigabits per second in a 60 nanometer CMOS process), depending on the CMOS process.

BRIEF SUMMARY

According to some embodiments, a clock data recovery circuit includes a phase detector circuit, a majority voter circuit, and a phase interpolator circuit. The phase detector circuit is operable to compare a phase of a periodic signal to a phase of a data signal to generate a phase error signal. The majority voter circuit includes a shift register circuit, an up/down binary counter, and a voting circuit. The shift register circuit and the up/down counter are operable to generate an output signal based on the phase error signal. The voting circuit is operable to generate a majority vote of the phase error signal based on the output signal of the shift register and the up/down counter. The phase interpolator circuit is operable to set the phase of the periodic signal based on the majority vote generated by the majority voter circuit.

Various objects, features, and advantages of the present invention will become apparent upon consideration of the following detailed description and the accompanying drawings.

DETAILED DESCRIPTION

Figure 1:
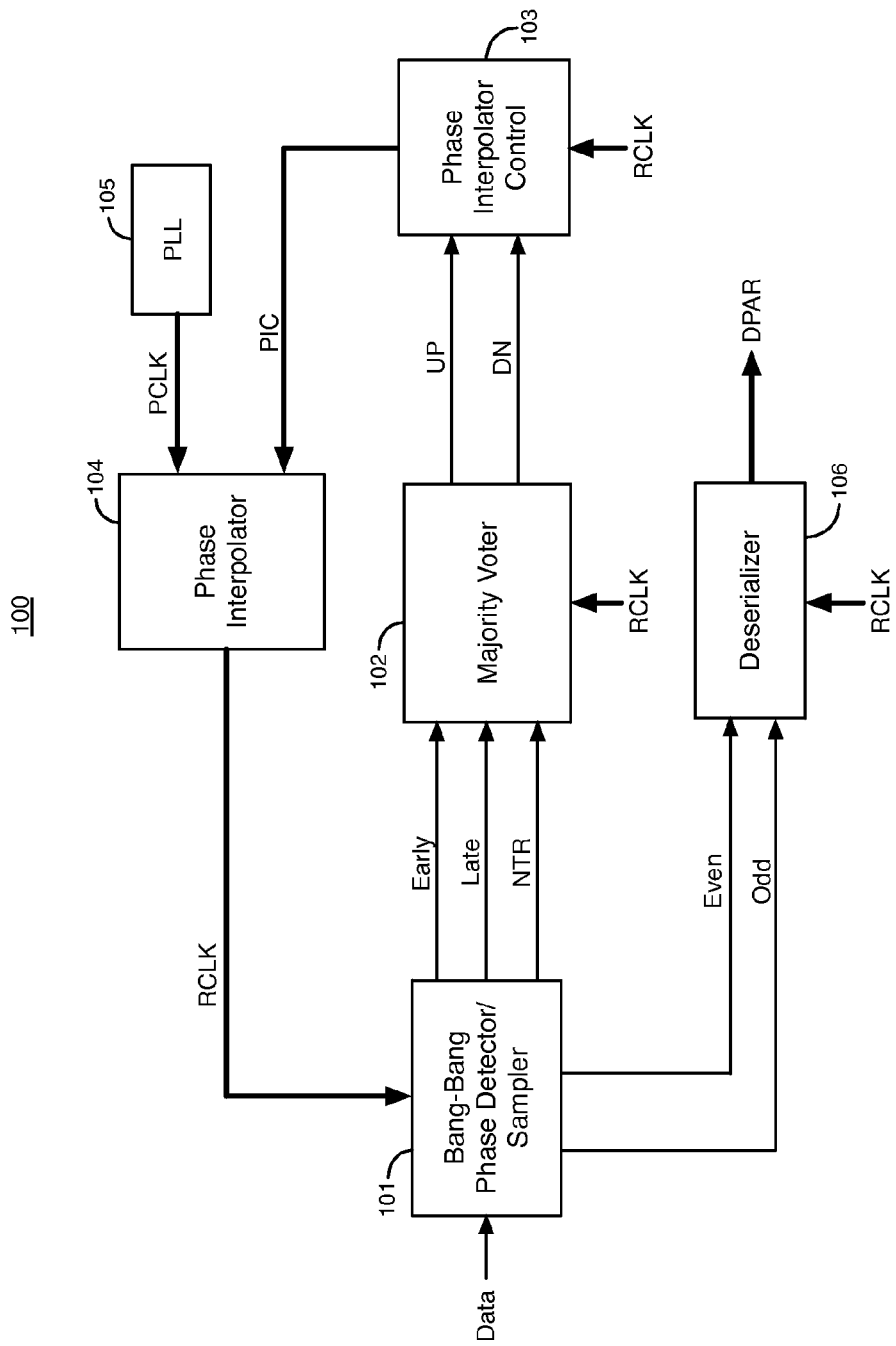
FIG. 1 illustrates an example of a clock data recovery (CDR) circuit, according to an embodiment of the present invention.

FIG. 1 illustrates an example of a clock data recovery (CDR) circuit 100, according to an embodiment of the present invention. CDR circuit 100 has a feedback loop circuit that has a programmable loop latency. The loop latency of the feedback loop circuit in CDR circuit 100 can be programmed to be larger than the loop latency of a conventional CDR circuit that uses only a binary counter in its filter circuit. As an example that is not intended to be limiting, CDR circuit 100 can be programmed to have a loop latency equal 120 unit intervals of the input data signal, as described in detail below.

CDR circuit 100 includes bang-bang phase detector and sampler circuit 101, majority voter circuit 102, phase interpolator control circuit 103, phase interpolator circuit 104, phase-locked loop (PLL) circuit 105, and deserializer circuit 106. The feedback loop circuit in CDR circuit 100 includes bang-bang phase detector and sampler circuit 101, majority voter circuit 102, phase interpolator control circuit 103, and phase interpolator circuit 104.

PLL circuit 105 generates multiple periodic clock signals PCLK (e.g., 8 clock signals). Clock signals PCLK are provided to inputs of phase interpolator circuit 104. Phase interpolator circuit 104 generates multiple periodic recovered clock signals RCLK in response to the clock signals PCLK generated by PLL circuit 105 and phase interpolator control (PIC) signals generated by phase interpolator control circuit 103. As an example, phase interpolator circuit 104 may generate 8 recovered clock signals RCLK that have phase offsets of 0°, 45°, 90°, 135°, 180°, 225°, 270°, and 315° relative to each other. As another example, phase interpolator circuit 104 may generate 4 recovered clock signals RCLK that have phase offsets of 0°, 90°, 180°, and 270° relative to each other. Recovered clock signals RCLK are provided from outputs of phase interpolator circuit 104 to inputs of bang-bang phase detector and sampler circuit 101, to inputs of majority voter circuit 102, to inputs of phase interpolator control circuit 103, and to inputs of deserializer circuit 106, as shown in FIG. 1.

A Data signal is provided to one or more inputs of bang-bang phase detector and sampler circuit 101. The Data signal may be a single-ended or a differential signal. The Data signal may be transmitted to CDR circuit 100 from a transmitter that is external to the integrated circuit containing CDR circuit 100 through transmission lines.

Figure 2:
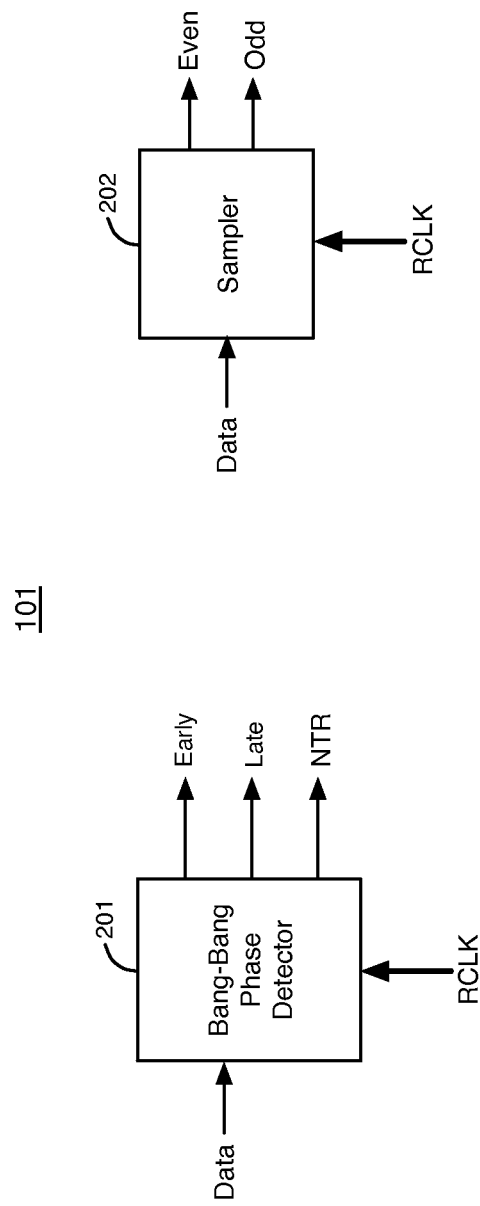
FIG. 2 illustrates further details of the bang-bang phase detector and sampler circuit in FIG. 1, according to an embodiment of the present invention.

FIG. 2 illustrates further details of bang-bang phase detector and sampler circuit 101, according to an embodiment of the present invention. As shown in FIG. 2, bang-bang phase detector and sampler circuit 101 includes bang-bang phase detector (BBPD) circuit 201 and sampler circuit 202. The Data signal is provided to bang-bang phase detector circuit 201 and to sampler circuit 202. The recovered clock signals RCLK generated by phase interpolator circuit 104 are provided to bang-bang phase detector circuit 201 and to sampler circuit 202.

In a half-rate embodiment of CDR circuit 100, a unit interval (UI) in the Data signal is the same duration as one-half of a period of each of the recovered clock signals RCLK. One unit interval in the Data signal is one bit period in the Data signal. For example, if the data rate of the Data signal is 3.2 Gigabits per second, the recovered clock signals have frequencies of 1.6 Gigahertz in a half-rate embodiment.

According to an exemplary half-rate embodiment, CDR circuit 100 adjusts the phases of the recovered clock signals RCLK in order to align the rising edges of the recovered clock signals RCLK having relative phase offsets of 90° and 270° with the logic state transitions in the Data signal. When the recovered clock signals RCLK having relative phase offsets of 90° and 270° are aligned with the logic state transitions in the Data signal, the rising edges of the recovered clock signal RCLK having a phase offset of 0° are in the centers of the even unit intervals of the Data signal, and the rising edges of the recovered clock signal RCLK having a phase offset of 180° are in the centers of the odd unit intervals of the Data signal.

BBPD circuit 201 compares the phases of the recovered clock signals RCLK to the phase of the Data signal to generate control signals Early, Late, and NTR. The Early and Late signals are phase error signals. In a half-rate embodiment, BBPD circuit 201 generates a logic high state in the Early signal and a logic low state in the Late signal in response to transitions in the Data signal occurring less than one-half a unit interval later in time than the rising edges in the 2 recovered clock signals RCLK that have relative phase offsets of 90° and 270°. BBPD circuit 201 generates a logic high state in the Late signal and a logic low state in the Early signal in response to transitions in the Data signal occurring less than one-half a unit interval earlier in time than the rising edges in the 2 recovered clock signals RCLK that have relative phase offsets of 90° and 270°. BBPD circuit 201 generates a logic high state in the no-transition (NTR) signal in response to no transition occurring in the logic state of the Data signal. BBPD circuit 201 generates a logic low state in the NTR signal in response to a transition occurring in the logic state of the Data signal.

Referring to FIG. 1, control signals Early, Late, and NTR are provided to inputs of majority voter circuit 102. Majority voter circuit 102 generates filtered digital control signals UP and DN based on control signals Early, Late, and NTR. Majority voter circuit 102 functions as a filter circuit in the feedback loop of CDR circuit 100. Majority voter circuit 102 is described in further detail below. Control signals UP and DN are provided to inputs of phase interpolator control circuit 103.

Phase interpolator control circuit 103 generates digital phase interpolator control (PIC) signals based on control signals UP and DN. The PIC signals are provided to inputs of phase interpolator circuit 104. Phase interpolator circuit 104 sets the phases of the recovered clock signals RCLK based on the logic states of the PIC signals. Phase interpolator circuit 104 adjusts the phases of the recovered clock signals RCLK based on changes in the logic states of the PIC signals. In response to the UP signal being in a logic high state, phase interpolator control circuit 103 adjusts the PIC signals to logic states that cause phase interpolator circuit 104 to shift the phases (i.e., the rising and falling edges) of the recovered clock signals RCLK later in time. In response to the DN signal being in a logic high state, phase interpolator control circuit 103 adjusts the PIC signals to logic states that cause phase interpolator circuit 104 to shift the phases of the recovered clock signals RCLK earlier in time.

Referring again to FIG. 2, sampler circuit 202 samples data bits in the Data signal in response to recovered clock signals RCLK to generate sampled data bits in output data signals Even and Odd. Sampler circuit 202 samples data bits in even unit intervals of the Data signal to generate a serial stream of sampled bits in the Even signal. Sampler circuit 202 samples data bits in odd unit intervals of the Data signal to generate a serial stream of sampled bits in the Odd signal.

Data signals Even and Odd are provided to inputs of deserializer circuit 106 as shown in FIG. 1. Deserializer circuit 106 converts the serial sampled data bits in data signals Even and Odd into parallel sampled data bits in response to one or more of the recovered clock signals RCLK. Deserializer circuit 106 outputs the parallel sampled data bits in parallel data signals DPAR.

Figure 3:
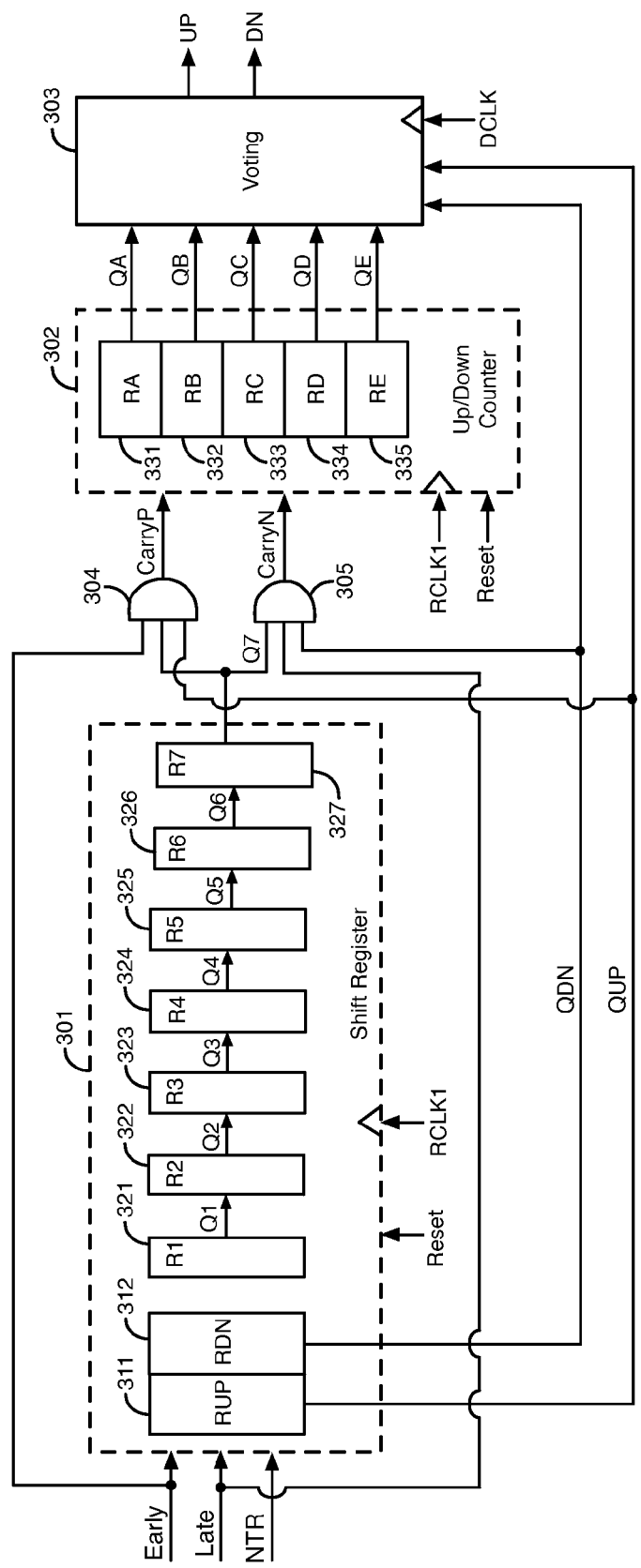
FIG. 3 illustrates details of the majority voter circuit in FIG. 1, according to an embodiment of the present invention.

FIG. 3 illustrates details of majority voter circuit 102, according to an embodiment of the present invention. Majority voter circuit 102 includes shift register circuit 301, up/down binary counter circuit 302, AND logic gate circuits 304-305, and voting circuit 303. Majority voter circuit 102 filters the Early and Late phase error signals to generate the filtered control signals UP and DN.

Shift register circuit 301 includes register circuits 311-312 and 321-327. The Early, Late, and NTR control signals are provided to inputs of shift register circuit 301. The register circuits 311 and 312 store signals QUP and QDN, respectively. The registers 321-327 store signals Q1-Q7, respectively. The signal Q7 stored in register circuit 327 is provided to inputs of AND logic gate circuits 304-305. Signal QDN and the Late signal are provided to inputs of AND logic gate circuit 305. Signal QUP and the Early signal are provided to inputs of AND logic gate circuit 304. AND logic gate circuit 304 generates a positive carry output signal CarryP that is provided to an up input of up/down counter circuit 302. AND logic gate circuit 305 generates a negative carry output signal CarryN that is provided to a down input of up/down counter circuit 302.

Up/down counter circuit 302 includes register circuits 331-335. Register circuits 331-335 store signals QA-QE, respectively. Signals QA-QE are count signals that are generated by up/down counter circuit 302. Each of the register circuits 311-312, 321-327 and 331-335 may be, for example, a flip-flop circuit. A fast clock signal RCLK1 is provided to inputs of shift register circuit 301 and up/down counter circuit 302. Clock signal RCLK1 is one of the recovered clock signals RCLK generated by phase interpolator circuit 104. A periodic Reset signal is provided to inputs of shift register circuit 301 and up/down counter circuit 302.

Signals QA-QE are provided to inputs of voting circuit 303. Signals QDN and QUP are provided to additional inputs of voting circuit 303. A frequency divided clock signal DCLK is provided to another input of voting circuit 303. Voting circuit 303 generates output signals UP and DN based on signals QDN, QUP, and QA-QE in response to clock signal DCLK.

Shift register 301 samples the logic states of the Early, Late, and NTR signals on each rising edge of clock signal RCLK1. When signal NTR is in a logic low state, majority voter 102 updates the signals stored in register circuits 311-312, 321-327, and 331-335 based on sampled values of the Early and Late signals, as described below. When signal NTR is in a logic high state, the signals stored in register circuits 311-312, 321-327, and 331-335 remain in their current logic states.

Table 1 below shows all of the possible logic states of signals QUP, QDN, and Q1-Q7 stored in registers 311-312 and 321-327, respectively. Shift register circuit 301 samples the logic states of the Early and Late signals on each rising edge of clock signal RCLK1 to generate samples of the Early and Late signals. The cumulative samples of the Early and Late signals shown in the second column of Table 1 equal the total number of samples of the Early signal that are in logic high states minus the total number of samples of the Late signal that are in logic high states. Majority voter 102 determines the logic states of signals QUP, QDN, and Q1-Q7 based on the cumulative samples of the Early and Late signals. In the Tables below, 1 refers to a logic high state in a signal, and 0 refers to a logic low state in a signal.

The numbers in the third column of Table 1 refer to signals QUP and QDN, respectively. For example, the numbers 10 in rows 2-8 of Table 1 are logic states of signals QUP and QDN, respectively. Signal QUP is a sign signal that is in a logic high state when the cumulative samples of the Early and Late signals are positive. Signal QDN is a sign signal that is in a logic high state when the cumulative samples of the Early and Late signals are negative. The numbers in the fourth column of Table 1 refer to signals Q1-Q7, respectively. For example, the numbers 0100000 in rows 3 and 10 of Table 1 are logic states of signals Q1-Q7, respectively.

TABLE 1

| Row No. | Cumulative samples of Early and Late signals | QUP, QDN | Q1, Q2, Q3, Q4, Q5, Q6, Q7 |
|---|---|---|---|
| 1 | 0 | 00 | 0000000 |
| 2 | +1 | 10 | 1000000 |
| 3 | +2 | 10 | 0100000 |
| 4 | +3 | 10 | 0010000 |
| 5 | +4 | 10 | 0001000 |
| 6 | +5 | 10 | 0000100 |
| 7 | +6 | 10 | 0000010 |
| 8 | +7 | 10 | 0000001 |
| 9 | −1 | 01 | 1000000 |
| 10 | −2 | 01 | 0100000 |
| 11 | −3 | 01 | 0010000 |
| 12 | −4 | 01 | 0001000 |
| 13 | −5 | 01 | 0000100 |
| 14 | −6 | 01 | 0000010 |
| 15 | −7 | 01 | 0000001 |

Initially, the signals QUP, QDN and Q1-Q7 stored in register circuits 311-312 and 321-327, respectively, are in logic low states, as shown in row 1 of Table 1. If shift register 301 samples a logic high state in the Early signal on the next rising edge of clock signal RCLK1, register circuits 311 and 321 store signals QUP and Q1 having logic high states, and registers 312 and 322-327 store signals QDN and Q2-Q7 having logic low states, as shown in row 2 of Table 1. After each logic high state that shift register 301 samples in the Early signal, the cumulative samples of the Early and Late signals increase by 1. As the cumulative samples of the Early and Late signals increase from +1 to +7, a signal having a logic high state is shifted through registers 321-327 from left to right in FIG. 3, and each of signals Q1-Q7 is in a logic high state in a different period of clock signal RCLK1, as shown in rows 2-8 of Table 1.

If the cumulative samples of the Early and Late signals are non-zero, only one of registers 321-327 stores a signal having a logic high state, the other 6 registers 321-327 store signals having logic low states, and only one of registers 311-312 stores a signal having a logic high state.

After each logic high state sampled in the Late signal, the cumulative samples of the Early and Late signals decrease by 1. As the cumulative samples of the Early and Late signals decrease from +7 to +1, a signal having a logic high state is shifted through shift registers 321-327 from right to left in FIG. 3 as shown in rows 2-8 of Table 1. If register 321 stores a signal having a logic high state when shift register 301 samples a logic high state in the Late signal on a rising edge of clock signal RCLK1, shift register 301 causes all of registers 311-312 and 321-327 to store signals having logic low states, as shown in row 1 of Table 1.

If all of registers 311-312 and 321-327 store signals having logic low states, and shift register 301 samples a logic high state in the Late signal on the next rising edge of clock signal RCLK1, registers 312 and 321 store signals QDN and Q1 having logic high states, and registers 311 and 322-327 store signals QUP and Q2-Q7 having logic low states, as shown in row 9 of Table 1. After each logic high state that shifter register 301 samples in the Late signal, the cumulative samples of the Early and Late signals decrease by 1. As the cumulative samples of the Early and Late signals decrease from −1 to −7, a signal having a logic high state is shifted through registers 321-327 from left to right in FIG. 3, and each of signals Q1-Q7 is in a logic high state in a different period of clock signal RCLK1, as shown in rows 9-15 of Table 1. As the cumulative samples of the Early and Late signals increase from −7 to −1, a signal having a logic high state is shifted through registers 321-327 from right to left in FIG. 3 as shown in rows 9-15 of Table 1.

Table 2 below shows the possible logic states of the signals QA-QE stored in registers 331-335 in up/down counter circuit 302. Up/down counter circuit 302 samples the logic states of the CarryP and CarryN signals on each rising edge of clock signal RCLK1 to generate samples of the CarryP and CarryN signals, respectively. The cumulative samples of the CarryP and CarryN signals shown in the second column of Table 2 equal the total number of samples of the CarryP signal that are in logic high states minus the total number of samples of the CarryN signal that are in logic high states in each period of clock signal DCLK. The numbers in the third column of Table 2 refer to the logic state of signal QE. The numbers in the fourth column of Table 2 refer to the logic states of signals QD, QC, QB, and QA, respectively. For example, the numbers 0101 in rows 6 and 27 of Table 1 are logic states of signals QD, QC, QB, and QA, respectively.

TABLE 2

| Row No. | Cumulative samples of CarryP and CarryN signals | QE | QD, QC, QB, QA |
|---|---|---|---|
| 1 | 0 | 0 | 0000 |
| 2 | +1 | 0 | 0001 |
| 3 | +2 | 0 | 0010 |
| 4 | +3 | 0 | 0011 |
| 5 | +4 | 0 | 0100 |
| 6 | +5 | 0 | 0101 |
| 7 | +6 | 0 | 0110 |
| 8 | +7 | 0 | 0111 |
| 9 | +8 | 0 | 1000 |
| 10 | +9 | 0 | 1001 |
| 11 | +10 | 0 | 1010 |
| 12 | +11 | 0 | 1011 |
| 13 | +12 | 0 | 1100 |
| 14 | +13 | 0 | 1101 |
| 15 | +14 | 0 | 1110 |
| 16 | +15 | 0 | 1111 |
| 17 | −1 | 1 | 1111 |
| 18 | −2 | 1 | 1110 |
| 19 | −3 | 1 | 1101 |
| 20 | −4 | 1 | 1100 |
| 21 | −5 | 1 | 1011 |
| 22 | −6 | 1 | 1010 |

TABLE 2-continued

| Row No. | Cumulative samples of CarryP and CarryN signals | QE | QD, QC, QB, QA |
|---|---|---|---|
| 23 | −7  | 1 | 1001 |
| 24 | −8  | 1 | 1000 |
| 25 | −9  | 1 | 0111 |
| 26 | −10 | 1 | 0110 |
| 27 | −11 | 1 | 0101 |
| 28 | −12 | 1 | 0100 |
| 29 | −13 | 1 | 0011 |
| 30 | −14 | 1 | 0010 |
| 31 | −15 | 1 | 0001 |

AND logic gate 304 generates a logic high state in signal CarryP in response to logic high states in signals Early, Q7, and QUP. AND logic gate 305 generates a logic high state in signal CarryN in response to logic high states in signals Late, Q7 and QDN.

Up/down counter circuit 302 is a binary counter circuit that updates the binary value of count signals QE, QD, QC, QB, and QA based on the logic states of the CarryP and CarryN signals that are sampled at each rising edge of clock signal RCLK1. Signal QE is a sign bit of the count signals. The binary value of signals QD, QC, QB, and QA is the magnitude of the count signals. With respect to the binary value of signals QA-QD, QD is the most significant bit, QC is the second most significant bit, QB is the second least significant bit, and QA is the least significant bit. In response to sampling a logic high state in the CarryP signal, up/down counter circuit 302 increases the binary value of count signals QE, QD, QC, QB, and QA by 1. In response to sampling a logic high state in the CarryN signal, up/down counter circuit 302 decreases the binary value of count signals QE, QD, QC, QB, and QA by 1.

Initially, the output signals QA-QE of registers 331-335 are all in logic low states as shown in row 1 of Table 2. After cumulative samples of +7 in the Early and Late signals, shift register 301 generates a logic high state in signal Q7. If the Early signal is in a logic high state on the next rising edge of clock signal RCLK1, the cumulative samples of the Early and Late signals are +8, and up/down counter circuit 302 samples a logic high state in the CarryP signal. Register 331 then generates a logic high state in signal QA, and the cumulative samples of signals CarryP and CarryN are +1, as shown in row 2 of Table 2.

In response to the cumulative samples of the Early and Late signals reaching +8, shift register 301 resets the logic states of signals Q1-Q7 to 0000000, shift register 301 resets the logic states of signals QUP and QDN to 00, and the cumulative samples of the Early and Late signals are 0, as shown in row 1 of Table 1. Thus, majority voter circuit 102 does not sample another logic high state in signal CarryP until additional cumulative samples of +8 are counted in the Early and Late signals.

The cumulative samples of the CarryP and CarryN signals increase by 1 each time that up/down counter circuit 302 samples a logic high state in the CarryP signal. After each increase of 1 in the cumulative samples of the CarryP and CarryN signals, the binary value of signals QE, QD, QC, QB, and QA increases by 1. The binary value of signals QD, QC, QB, and QA increases from 0001 to 1111 after the cumulative samples of the CarryP and CarryN signals increase from +1 to +15, and signal QE remains in a logic low state, as shown in rows 2-16 of Table 2.

After cumulative samples of −7 in the Early and Late signals, shift register 301 generates a logic high state in signal Q7. If the Late signal is in a logic high state on the next rising edge of clock signal RCLK1, the cumulative samples of the Early and Late signals are −8, and up/down counter circuit 302 samples a logic high state in the CarryN signal. After sampling a logic high state in the CarryN signal, up/down counter circuit 302 decreases the cumulative samples of signals CarryP and CarryN by 1. Subsequently, shift register 301 resets the logic states of signals Q1-Q7 to 0000000, shift register 301 resets the logic states of signals QUP and QDN to 00, and the cumulative samples of the Early and Late signals are 0, as shown in row 1 of Table 1. Thus, majority voter circuit 102 does not sample another logic high state in signal CarryN, until additional cumulative samples of −8 are counted in the Early and Late signals.

The cumulative samples of the CarryP and CarryN signals decrease by 1 each time that up/down counter circuit 302 samples a logic high state in the CarryN signal. After each decrease of 1 in the cumulative samples of the CarryP and CarryN signals, the binary value of signals QE, QD, QC, QB, and QA decreases by 1. The binary value of signals QD, QC, QB, and QA decreases from 1111 to 0001 after the cumulative samples of the CarryP and CarryN signals decrease from +15 to +1, and signal QE remains in a logic low state, as shown in rows 2-16 of Table 2. Register 335 causes signal QE to be in a logic low state when the cumulative samples of the CarryP and CarryN signals have a value from 0 to +15, as shown in rows 1-16 of Table 1.

When the cumulative samples of signals CarryP and CarryN are −1, registers 331-335 generate logic high states in all 5 of signals QA-QE, as shown in row 17 of Table 2. The binary value of signals QD, QC, QB, and QA decreases from 1111 to 0001 after the cumulative samples of the CarryP and CarryN signals decrease from −1 to −15, and signal QE remains in a logic high state, as shown in rows 17-31 of Table 2. The binary value of signals QD, QC, QB, and QA increases from 0001 to 1111 after the cumulative samples of the CarryP and CarryN signals increase from −15 to −1, and signal QE remains in a logic high state, as shown in rows 17-31 of Table 2. Register 335 causes signal QE to be in a logic high state when the cumulative samples of the CarryP and CarryN signals have a value from −1 to −15.

Voting circuit 303 updates the logic states of the UP and DN signals based on signals QA-QE, QUP, and QDN at each rising edge of frequency divided periodic clock signal DCLK. Majority voter circuit 102 updates the logic states of the UP and DN signals at repeating intervals of time that are equal in duration, because clock signal DCLK has a constant period.

A frequency divider circuit (not shown) divides the frequency of clock signal RCLK1 by a positive integer greater than 1 to generate the frequency of clock signal DCLK. The period of clock signal DCLK determines the loop latency of CDR circuit 100. In a half-rate embodiment of CDR circuit 100, the loop latency of CDR circuit 100 (in terms of the number of unit intervals in the Data signal) equals two times the number of periods of clock signal RCLK1 in one period of clock signal DCLK. For example, the period of clock signal DCLK can be set to 60 times one period of clock signal RCLK1 to provide a loop latency for CDR circuit 100 of 120 unit intervals of the Data signal. According to other embodiments, the loop latency of CDR circuit 100 may, for example, be set to 8, 20, 40, 60, 80, or 100 unit intervals of the Data signal by selecting an appropriate value for the period of clock signal DCLK.

The loop latency of CDR circuit 100 is programmable. The loop latency of CDR circuit 100 can be adjusted by changing the period of clock signal DCLK to support different parts per million (PPM) requirements in the Data signal. After the period of clock signal DCLK has been programmed, the period of clock signal DCLK and the loop latency remain constant during the operation of CDR circuit 100.

The loop latency of CDR circuit 100 can be increased by increasing the period of clock signal DCLK. Increasing the loop latency of CDR circuit 100 increases the jitter tolerance of CDR circuit 100, because majority voter circuit 102 takes more samples of the Early and Late signals to average out the effects of random jitter in the Early and Late signals before updating the UP and DN majority vote signals. Thus, majority voter circuit 102 updates the UP and DN signals less frequently. However, increasing the loop latency increases the time it takes for CDR circuit 100 to align the phases of the recovered clock signals with the phase of the Data signal, which decreases the PPM tolerance and increases the CDR lock time.

The loop latency of CDR circuit 100 can be decreased by decreasing the period of clock signal DCLK. Decreasing the loop latency of CDR circuit 100 decreases the jitter tolerance of CDR circuit 100, because majority voter circuit 102 takes less samples of the Early and Late signals before updating the UP and DN majority vote signals. Thus, majority voter circuit 102 updates the UP and DN signals more frequently. Decreasing the loop latency decreases the time it takes for CDR circuit 100 to align the phases of the recovered clock signals with the phase of the Data signal, which increases the PPM tolerance and decreases the CDR lock time. Changes in the data rate of the Data signal can, for example, be measured in parts per million (PPM) of a unit interval of the Data signal. Decreasing the loop latency allows CDR circuit 100 to track larger changes in the phase of the Data signal (i.e., a larger phase shift in PPM).

Cascading shift register 301 and counter circuit 302 in majority voter circuit 102 as shown in FIG. 3 and described herein enables CDR circuit 100 to have a larger loop latency and improved jitter tolerance.

Majority voter 102 generates the logic states of the UP and DN signals based on a majority vote of the samples of the Early and Late signals within each period of clock signal DCLK. Voting circuit 303 generates the UP and DN signals based on the logic states of the QA, QB, QC, QD, QE, QUP, and QDN signals. Voting circuit 303 causes the UP signal to be in a logic high state (i.e., UP=1) and the DN signal to be in a logic low state (i.e., DN=0), if (QE=0 and (QA#0 or QB#0 or QC#0 or QD#0)) or (QA=0 and QB=0 and QC=0 and QD=0 and QE=0 and QUP=1). Voting circuit 303 causes the DN signal to be in a logic high state (i.e., DN=1) and the UP signal to be in a logic low state (i.e., UP=0), if (QE=1 and (QA#0 or QB#0 or QC#0 or QD#0)) or (QA=0 and QB=0 and QC=0 and QD=0 and QE=0 and QDN=1). Voting circuit 303 contains digital logic circuitry that implements these logic functions.

Voting circuit 303 provides a greater weight to the output signals QA-QE of up/down counter circuit 302 than to the output signals QUP and QDN of registers 311-312 when calculating the logic states of the UP and DN signals. Voting circuit 303 determines the logic states of the UP and DN signals based on signals QA-QE if at least one of signals QA-QE is in a logic high state. If all of signals QA-QE are in logic low states, voting circuit 303 determines the logic states of the UP and DN signals based on signals QUP and QDN.

Figure 4:
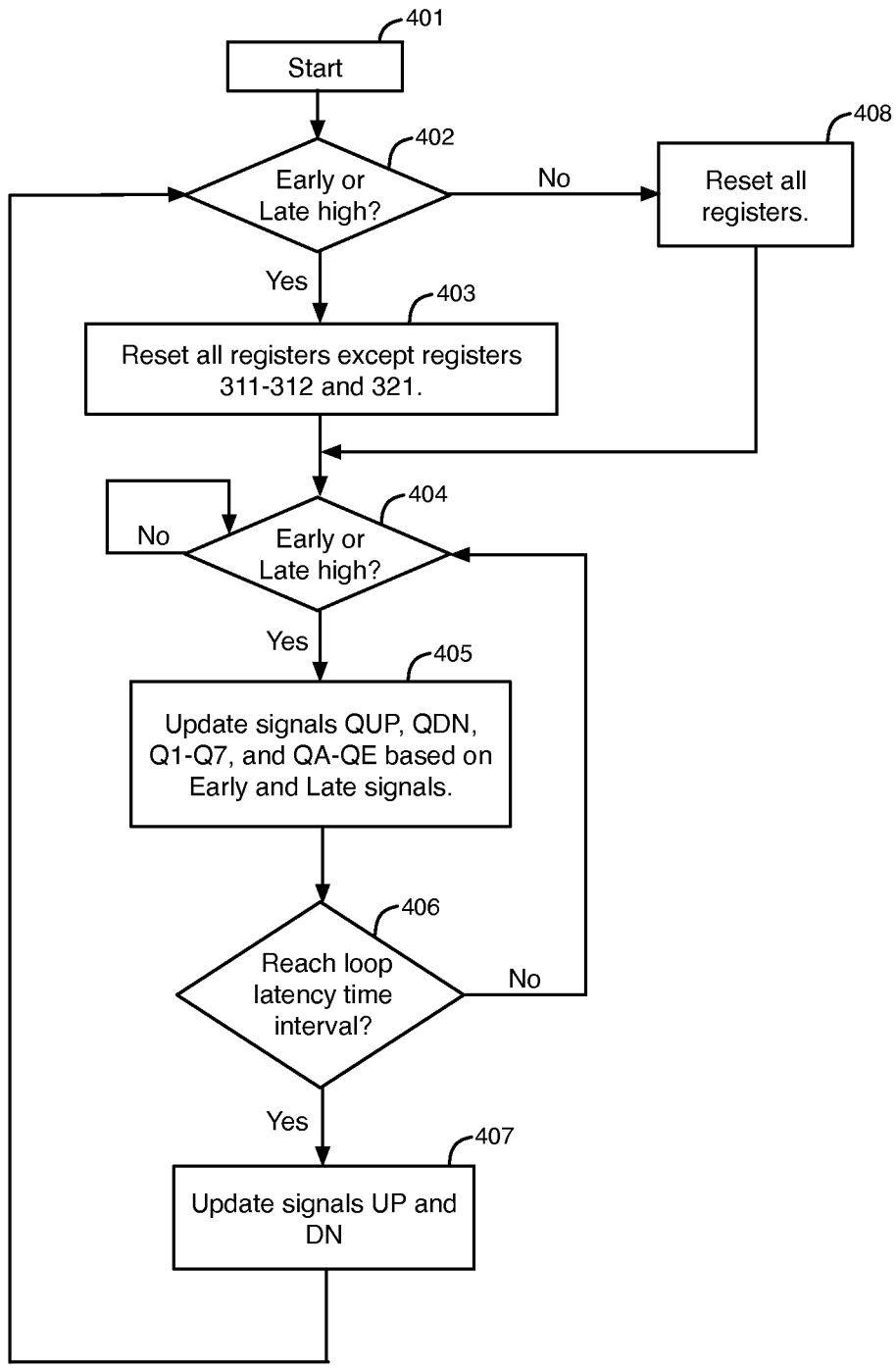
FIG. 4 illustrates an exemplary flow chart that shows operations of the majority voter circuit, according to an embodiment of the present invention.

FIG. 4 illustrates a flow chart of operations of majority voter circuit 102, according to an embodiment of the present invention. Majority voter circuit 102 begins at start operation 401. The Reset signal is an active-low signal. The Reset signal is asserted in a logic low state for a duration equivalent to one period of clock signal RCLK1. Each rising edge of clock signal DCLK is at the center of a logic low state of the Reset signal. In response to each rising edge in clock signal DCLK during the logic low state of the Reset signal, majority voter circuit 102 performs decision operation 402. In decision operation 402, majority voter circuit 102 determines if the sampled value of the Early signal or the sampled value of the Late signal is in a logic high state.

If the sampled value of the Early signal or the sampled value of the Late signal is in a logic high state in operation 402, then majority voter circuit 102 resets registers 322-327 and 331-335 in operation 403 in response to a rising edge in the RCLK1 clock signal during the logic low state of the Reset signal so that each of registers 322-327 and 331-335 stores a signal having a logic low state. In operation 403, the logic states of the signals QUP, QDN, and Q1 stored in registers 311-312 and 321 are preset or reset according to the Early or Late signals. If the sampled value of the Early signal is in a logic high state, signals QUP and Q1 are preset to logic high states, and signal QDN is reset to a logic low state. If the sampled value of the Late signal is in a logic high state, signals QDN and Q1 are preset to logic high states, and signal QUP is reset to a logic low state. These functions enable majority voter circuit 102 to provide continuous tracking of the Early and Late signals by presetting or resetting the logic states of the signals stored in registers 311-312 and 321 accordingly during the reset operation 403. As a result, majority voter circuit 102 does not miss information from bang-bang phase detector and sampler circuit 101 during reset operation 403.

If the sampled values of the Early and Late signals are both in logic low states in decision operation 402, then majority voter circuit 102 resets all of registers 311-312, 321-327, and 331-335 in operation 408 in response to a rising edge of the RCLK1 clock signal during the logic low state of the Reset signal so that each of registers 311-312, 321-327, and 331-335 stores a signal having a logic low state. After operation 403 or operation 408, majority voter circuit 102 proceeds to decision operation 404. In decision operation 404, majority voter circuit 102 again determines if the sampled value of the Early signal or the sampled value of the Late signal is in a logic high state. If the sampled values of the Early and Late signals are both in logic low states in decision operation 404, then majority voter circuit 102 repeats decision operation 404 while maintaining the signals stored in all of registers 311-312, 321-327, and 331-335 at constant logic states.

If the sampled value of the Early signal or the sampled value of the Late signal is in a logic high state in operation 404, then majority voter circuit 102 updates the signals QUP, QDN, Q1-Q7, and QA-QE stored in registers 311-312, 321-327, and 331-335, respectively, in operation 405 based on the Early and Late signals, as described above with respect to FIG. 3. Majority voter circuit 102 determines if the loop latency time interval has been reached at decision operation 406. The loop latency time interval of CDR circuit 100 is reached at each rising edge of clock signal DCLK. Thus, majority voter circuit 102 determines if the loop latency time interval has been reached based on clock signal DCLK.

If the loop latency time interval has not been reached at decision operation 406, then majority voter circuit 102 returns to decision operation 404. If the loop latency time interval has been reached at decision operation 406, then majority voter circuit 102 updates the logic states of the majority vote signals UP and DN based on the logic states of signals QA-QE, QUP, and QDN at operation 407, as described above with respect to FIG. 3. Subsequently, majority voter circuit 102 returns to decision operation 402.

Figure 5:
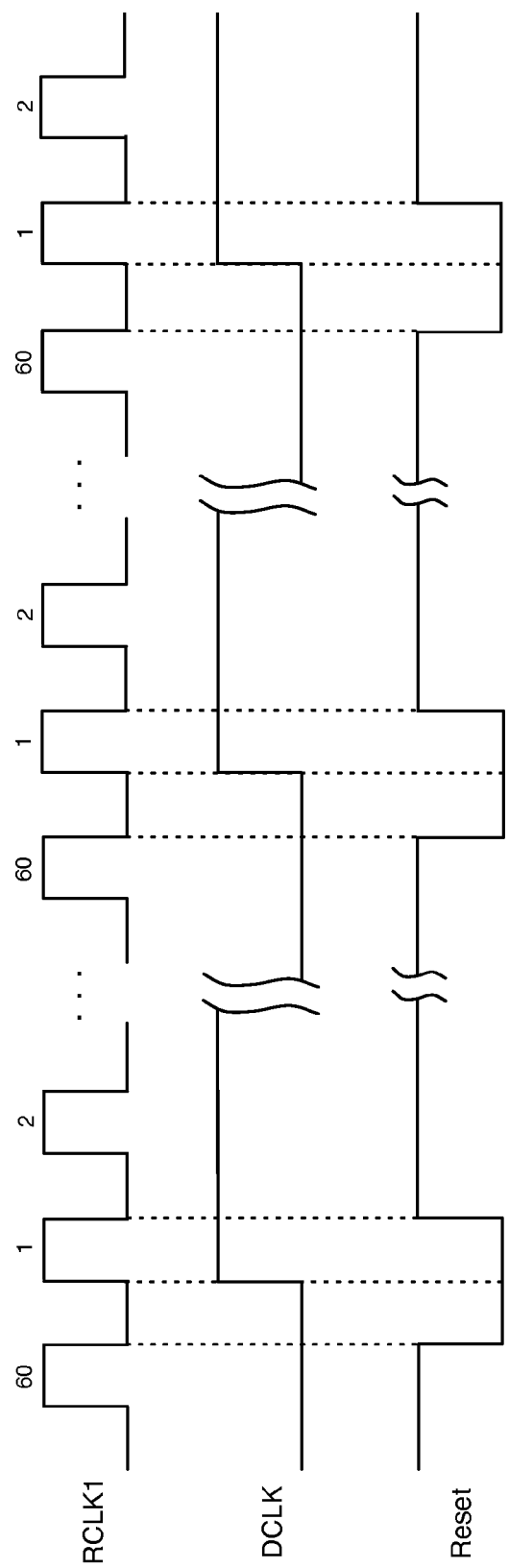
FIG. 5 is a timing diagram that illustrates example waveforms for clock and reset signals in the majority voter circuit for a loop latency setting of 120 unit intervals of the data signal, according to an embodiment of the present invention.

FIG. 5 is a timing diagram that illustrates example waveforms for clock signals RCLK1 and DCLK and for the Reset signal, according to an embodiment of the present invention. In the embodiment of FIG. 5, the loop latency of CDR circuit 100 equals 120 unit intervals of the Data signal, and the period of the DCLK clock signal equals 60 times the period of the RCLK1 clock signal. The Reset signal is a periodic signal having a period that equals the period of clock signal DCLK. In an embodiment, clock signal DCLK and the Reset signal are generated by a programmable multi-modulus divider circuit.

The period of clock signal DCLK equals 60 times the period of clock signal RCLK1. Thus, 60 periods of clock signal RCLK1 occur during one period of clock signal DCLK. Only three periods of the 60 periods of clock signal RCLK1 numbered 1, 2, and 60 are shown in FIG. 5 in each period of clock signal DCLK to simplify the drawing. Portions of the waveforms for signals RCLK1, DCLK and Reset are not shown in FIG. 5 to simplify the drawing. Each rising edge in the Reset signal occurs one-half a period of clock signal RCLK1 after each rising edge in clock signal DCLK. When the Reset signal is in a logic low state, shift register 301 resets and/or presets registers 311-312 and 321-327 and up/down counter circuit 302 resets registers 331-335 as described above in operations 403 and 408 in response to a rising edge in clock signal RCLK1.

According to other embodiments, shift register circuit 301 may have a different number of register circuits, and up/down counter circuit 302 may have a different number of register circuits. For example, shift register circuit 301 may have 4, 5, 6, 8, 9, or 10 register circuits in place of the 7 register circuits 321-327, and up/down counter circuit 302 may have 3, 4, 6, 7, or 8 register circuits that generate a corresponding number of count signals in place of register circuits 331-335. According to some embodiments, the counting mechanism of up/down counter circuit 302 functions as described herein, regardless of the number of the registers in shift register circuit 301 and up/down counter circuit 302. Increasing the number of registers in the majority voter circuit reduces the maximum frequency that the majority voter circuit can operate at.

Figure 6:
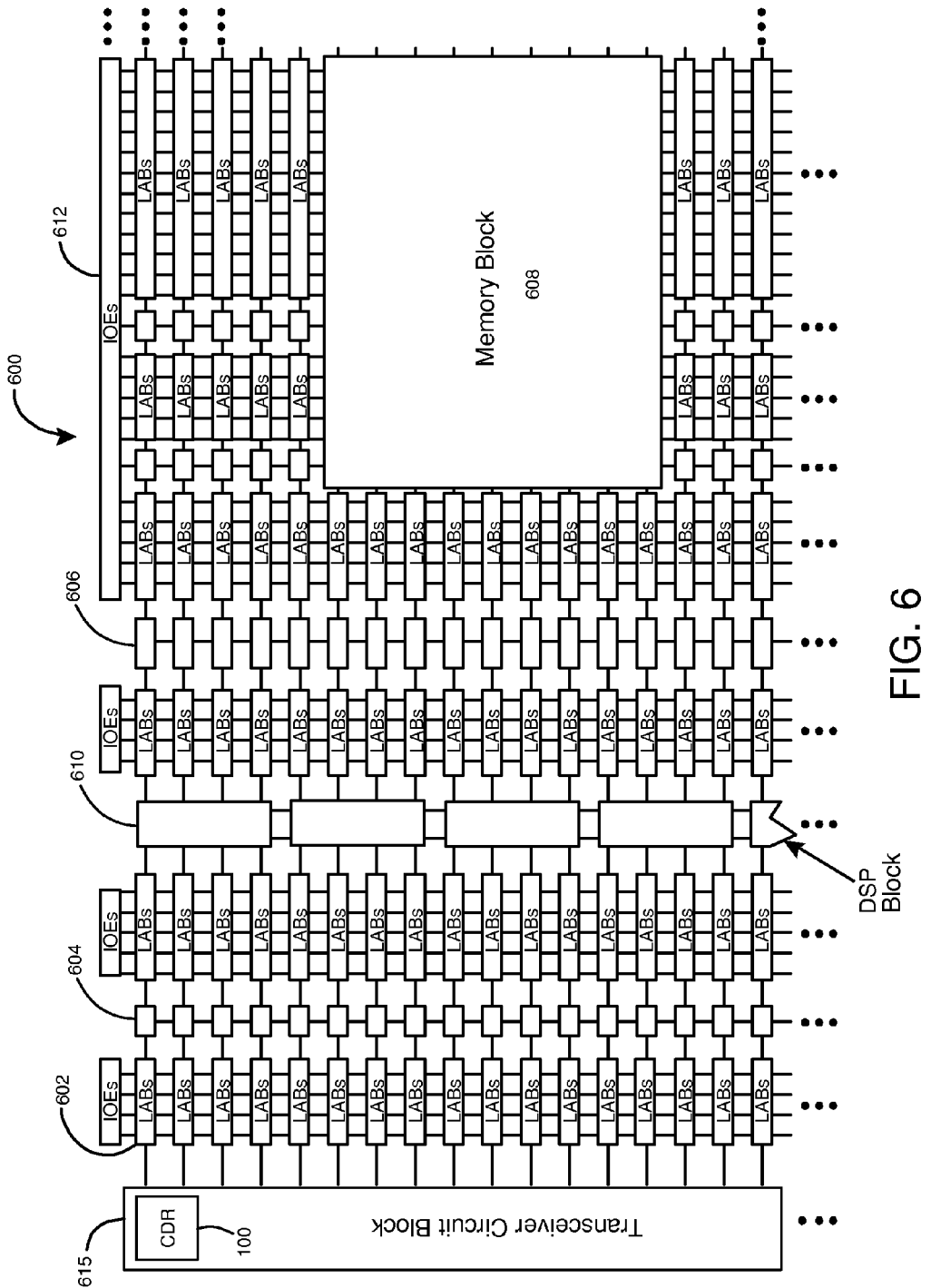
FIG. 6 is a simplified partial block diagram of a field programmable gate array (FPGA) that can include aspects of the present invention.

FIG. 6 is a simplified partial block diagram of a field programmable gate array (FPGA) 600 that can include aspects of the present invention. FPGA 600 is merely one example of an integrated circuit that can include features of the present invention. It should be understood that embodiments of the present invention can be used in numerous types of integrated circuits such as field programmable gate arrays (FPGAs), programmable logic devices (PLDs), complex programmable logic devices (CPLDs), programmable logic arrays (PLAs), application specific integrated circuits (ASICs), memory integrated circuits, central processing units, microprocessors, analog integrated circuits, etc.

FPGA 600 includes a two-dimensional array of programmable logic array blocks (or LABs) 602 that are interconnected by a network of column and row interconnect conductors of varying length and speed. LABs 602 include multiple (e.g., 10) logic elements (or LEs).

An LE is a programmable logic circuit block that provides for efficient implementation of user defined logic functions. An FPGA has numerous logic elements that can be configured to implement various combinatorial and sequential functions. The logic elements have access to a programmable interconnect structure. The programmable interconnect structure can be programmed to interconnect the logic elements in almost any desired configuration.

FPGA 600 also includes a distributed memory structure including random access memory (RAM) blocks of varying sizes provided throughout the array. The RAM blocks include, for example, blocks 604, blocks 606, and block 608. These memory blocks can also include shift registers and first-in-first-out (FIFO) buffers.

FPGA 600 further includes digital signal processing (DSP) blocks 610 that can implement, for example, multipliers with add or subtract features. Input/output elements (IOEs) 612 support numerous single-ended and differential input/output standards. IOEs 612 include input and output buffers that are coupled to pads of the integrated circuit. The pads are external terminals of the FPGA die that can be used to route, for example, input signals, output signals, and supply voltages between the FPGA and one or more external devices. FPGA 600 also includes transceiver circuit block 615. Transceiver circuit block 615 includes transmitters and receivers. A CDR circuit 100 resides in transceiver circuit block 615. FPGA 600 is described herein for illustrative purposes. Embodiments of the present invention can be implemented in many different types of integrated circuits.

Figure 7:
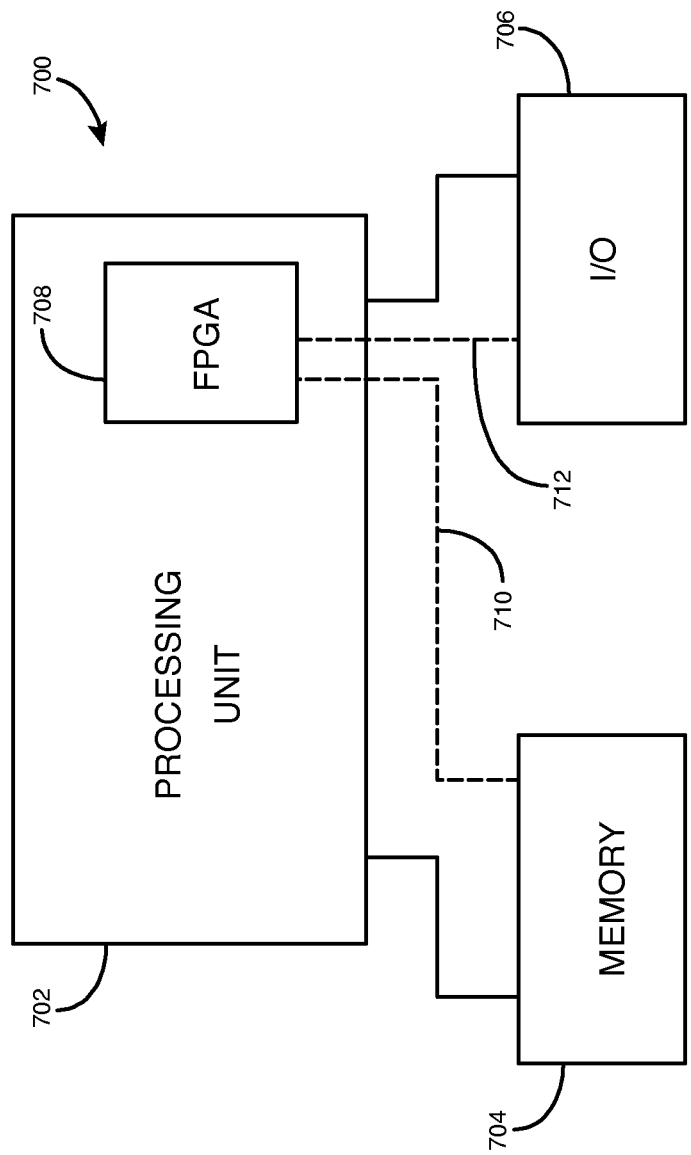
FIG. 7 shows a block diagram of an exemplary digital system that can embody techniques of the present invention.

The present invention can also be implemented in a system that has an FPGA as one of several components. FIG. 7 shows a block diagram of an exemplary digital system 700 that can embody techniques of the present invention. System 700 can be a programmed digital computer system, digital signal processing system, specialized digital switching network, or other processing system. Moreover, such systems can be designed for a wide variety of applications such as telecommunications systems, automotive systems, control systems, consumer electronics, personal computers, Internet communications and networking, and others. Further, system 700 can be provided on a single board, on multiple boards, or within multiple enclosures.

System 700 includes a processing unit 702, a memory unit 704, and an input/output (I/O) unit 706 interconnected together by one or more buses. According to this exemplary embodiment, an FPGA 708 is embedded in processing unit 702. FPGA 708 can serve many different purposes within the system of FIG. 7. FPGA 708 can, for example, be a logical building block of processing unit 702, supporting its internal and external operations. FPGA 708 is programmed to implement the logical functions necessary to carry on its particular role in system operation. FPGA 708 can be specially coupled to memory 704 through connection 710 and to I/O unit 706 through connection 712.

Processing unit 702 can direct data to an appropriate system component for processing or storage, execute a program stored in memory 704, receive and transmit data via I/O unit 706, or other similar functions. Processing unit 702 can be a central processing unit (CPU), microprocessor, floating point coprocessor, graphics coprocessor, hardware controller, microcontroller, field programmable gate array programmed for use as a controller, network controller, or any type of processor or controller. Furthermore, in many embodiments, there is often no need for a CPU.

For example, instead of a CPU, one or more FPGAs 708 can control the logical operations of the system. As another example, FPGA 708 acts as a reconfigurable processor that can be reprogrammed as needed to handle a particular computing task. Alternatively, FPGA 708 can itself include an embedded microprocessor. Memory unit 704 can be a random access memory (RAM), read only memory (ROM), fixed or flexible disk media, flash memory, tape, or any other storage means, or any combination of these storage means.

The foregoing description of the exemplary embodiments of the present invention has been presented for the purposes of illustration and description. The foregoing description is not intended to be exhaustive or to limit the present invention to the examples disclosed herein. In some instances, features of the present invention can be employed without a corresponding use of other features as set forth. Many modifications, substitutions, and variations are possible in light of the above teachings, without departing from the scope of the present invention.

What is claimed is:

1. A circuit comprising:
a phase detector circuit to compare a phase of a periodic signal to a phase of a data signal to generate a first phase error signal and a second phase error signal;
a majority voter circuit to store a first sign signal that indicates when cumulative samples of the first and the second phase error signals are positive, wherein the majority voter circuit stores a second sign signal that indicates when the cumulative samples of the first and the second phase error signals are negative, wherein the majority voter circuit generates a majority vote of the first and the second phase error signals based on the first sign signal and based on the second sign signal; and
a phase shift circuit to set the phase of the periodic signal based on the majority vote generated by the majority voter circuit.

2. The circuit of claim 1 wherein the majority voter circuit further comprises:
a counter circuit to generate count signals; and
a shift register circuit to generate an output signal indicating the cumulative samples of the first and the second phase error signals, wherein the counter circuit varies the count signals based on the output signal of the shift register circuit.

3. The circuit of claim 2 wherein the counter circuit causes a subset of the count signals to indicate a magnitude of the count signals and one of the count signals to be a sign bit.

4. The circuit of claim 1 wherein the majority voter circuit further comprises:
a counter circuit to generate count signals indicating the cumulative samples of the first and the second phase error signals.

5. The circuit of claim 4 wherein the majority voter circuit further comprises a voting logic circuit to generate control signals that indicate the majority vote based on the count signals, based on the first sign signal, and based on the second sign signal.

6. The circuit of claim 1 wherein the majority voter circuit updates the majority vote at repeating time intervals of same duration.

7. The circuit of claim 1 wherein the circuit is a clock data recovery circuit in an integrated circuit, and the phase shift circuit is a phase interpolator circuit.

8. A circuit comprising:
a phase detector circuit to generate a first phase error signal based on a phase comparison between a periodic signal and an input;
a majority voter circuit comprising a shift register circuit, a first logic circuit, and a counter circuit, wherein the shift register circuit generates an output signal based on the first phase error signal, wherein the majority voter circuit generates a first sign signal based on the first phase error signal, wherein the first logic circuit generates a first carry signal based on the first sign signal, the first phase error signal, and the output signal of the shift register circuit, wherein the counter circuit generates count signals based on the first carry signal, and wherein the majority voter circuit generates a majority vote of the first phase error signal based on the count signals; and
a phase shift circuit to set a phase of the periodic signal based on the majority vote.

9. The circuit of claim 8 wherein the phase detector circuit generates the first phase error signal and a second phase error signal based on the phase comparison, wherein the majority voter circuit generates a second sign signal based on the first and the second phase error signals, wherein the majority voter circuit further comprises a second logic circuit that generates a second carry signal based on the second sign signal, the second phase error signal, and the output signal of the shift register circuit, and wherein the counter circuit adjusts the count signals based on cumulative samples of the first and the second carry signals.

10. The circuit of claim 9 wherein the majority voter circuit resets the counter circuit and registers in the shift register circuit during a periodic reset interval, and wherein the majority voter circuit updates the first and the second sign signals and a signal stored in the shift register circuit in response to the first phase error signal during the periodic reset interval.

11. A circuit comprising:
a phase detector circuit to generate a phase error signal based on a phase comparison between a periodic signal and a data signal;
a majority voter circuit to store a first sign signal based on the phase error signal, wherein the majority voter circuit stores a second sign signal based on the phase error signal, and wherein the majority voter circuit generates a majority vote of the phase error signal based on the first sign signal and the second sign signal; and
a phase shift circuit to set a phase of the periodic signal based on the majority vote generated by the majority voter circuit.

12. The circuit of claim 11 wherein the majority voter circuit comprises a voting logic circuit to generate control signals indicative of the majority vote based on the first sign signal and the second sign signal, and wherein the phase shift circuit sets the phase of the periodic signal based on the control signals.

13. The circuit of claim 11 wherein the majority voter circuit comprises a shift register circuit and a counter circuit, wherein the shift register circuit generates an output signal based on the phase error signal, wherein the counter circuit varies count signals based on the output signal circuit, and wherein the majority voter circuit generates the majority vote based on the count signals, the first sign signal, and the second sign signal.

14. The circuit of claim 13 wherein the counter circuit varies the count signals based on the output signal of the shift register circuit and based on the first and the second sign signals.

15. The circuit of claim 13 wherein the majority voter circuit resets the counter circuit and register circuits in the shift register circuit during a periodic reset interval, and wherein the majority voter circuit updates the first and the second sign signals and a signal stored in the shift register circuit in response to the phase error signal during the periodic reset interval.

16. The circuit of claim 13 wherein the counter circuit varies the count signals based on the output signal of the shift register circuit and based on the first sign signal.

17. A method comprising:
comparing a phase of a periodic signal to a phase of a data signal to generate first and second phase error signals using a phase detector circuit;
generating a majority vote of the first and the second phase error signals based on a first sign signal that indicates when cumulative samples of the first and the second phase error signals are positive and based on a second sign signal that indicates when the cumulative samples of the first and the second phase error signals are negative using a majority voter circuit; and adjusting the phase of the periodic signal using a phase shift circuit based on the majority vote of the first and the second phase error signals to track changes in the phase of the data signal.

18. The method of claim 17 wherein generating a majority vote of the first and the second phase error signals based on a first sign signal that indicates when cumulative samples of the first and the second phase error signals are positive and based on a second sign signal that indicates when the cumulative samples of the first and the second phase error signals are negative further comprises generating an output signal of a shift register circuit based on the cumulative samples of the first and the second phase error signals, generating count signals using a counter circuit, varying the count signals based on the output signal of the shift register circuit, and generating the majority vote based on the count signals.

19. The method of claim 18 wherein generating a majority vote of the first and the second phase error signals based on a first sign signal that indicates when cumulative samples of the first and the second phase error signals are positive and based on a second sign signal that indicates when the cumulative samples of the first and the second phase error signals are negative further comprises storing the first sign signal in a first storage circuit based on the cumulative samples of the first and the second phase error signals, and storing the second sign signal in a second storage circuit based on the cumulative samples of the first and the second phase error signals.

20. The method of claim 19 wherein generating a majority vote of the first and the second phase error signals based on a first sign signal that indicates when cumulative samples of the first and the second phase error signals are positive and based on a second sign signal that indicates when the cumulative samples of the first and the second phase error signals are negative further comprises resetting the counter circuit and registers in the shift register circuit during a periodic reset interval, and updating the first and the second sign signals and a signal stored in the shift register circuit in response to the first phase error signal during the periodic reset interval.

\* \* \* \* \*